(12) United States Patent
Nelson

(10) Patent No.: US 10,288,203 B2
(45) Date of Patent: May 14, 2019

(54) LATCHING CONNECTOR WITH RADIAL GROOVES

(71) Applicant: Nelson Products, Inc., Golden, CO (US)

(72) Inventor: Carl Nelson, Golden, CO (US)

(73) Assignee: NELSON PRODUCTS, INC., Golden, CO (US)

(*) Notice: Subject to any disclaimer, the term of this patent is extended or adjusted under 35 U.S.C. 154(b) by 116 days.

(21) Appl. No.: 15/129,332

(22) PCT Filed: Mar. 26, 2015

(86) PCT No.: PCT/US2015/022860
§ 371 (c)(1),
(2) Date: Sep. 26, 2016

(87) PCT Pub. No.: WO2015/148865
PCT Pub. Date: Oct. 1, 2015

(65) Prior Publication Data
US 2017/0175938 A1  Jun. 22, 2017

Related U.S. Application Data

(60) Provisional application No. 61/970,822, filed on Mar. 26, 2014.

(51) Int. Cl.
*F16L 37/22* (2006.01)
*F16F 1/06* (2006.01)
(Continued)

(52) U.S. Cl.
CPC .............. *F16L 37/22* (2013.01); *F16B 21/07* (2013.01); *F16B 21/12* (2013.01); *F16B 21/205* (2013.01);
(Continued)

(58) Field of Classification Search
CPC . F16L 37/22; F16F 1/045; F16B 21/07; F16B 21/125; F16B 21/18; F16B 21/186;
(Continued)

(56) References Cited

U.S. PATENT DOCUMENTS 2,154,275 A * 4/1939 Linn .................. H01J 13/20
219/158
4,655,462 A  4/1987 Balsells
(Continued)

OTHER PUBLICATIONS

Bal Seal Engineering Company, Inc., Canted Coil Springs, Catalog No. DM3M Rev. A, Jul. 17, 1992, "Circular and Spring Lengths for Radial and Axial Loading," (24 pages).
(Continued)

*Primary Examiner* — Matthew R McMahon

(57) ABSTRACT

A latching connector having a pin, a housing, and a canted coil spring is disclosed. The housing has an opening that slidably receives the pin. The housing and the pin each have a groove that is sized and dimensioned to receive a portion of the canted coil spring. The pin groove and housing groove have a curved surface with a radius that is equal to or larger than the major axis of the canted coil spring. The canted coil spring has an outer diameter that is equal to or larger than the diameter of the housing groove. Together, the pin, housing, and canted coil spring provide a latching connector with a reliable and consistent connect force and disconnect force. The latching connector provides improved electrical conductivity from the pin to the housing by providing multiple contact points with the canted coil spring.

8 Claims, 3 Drawing Sheets

(51) Int. Cl.
  *F16B 21/20* (2006.01)
  *F16B 21/07* (2006.01)
  *F16B 21/12* (2006.01)
  *F16F 1/04* (2006.01)

(52) U.S. Cl.
  CPC .............. *F16F 1/045* (2013.01); *F16F 1/065* (2013.01); *Y10T 403/602* (2015.01)

(58) Field of Classification Search
  CPC ..... F16B 21/12; H01R 13/187; H01R 4/4863; H01R 13/2421; H01R 13/6277; Y10T 403/602; Y10T 403/60
  See application file for complete search history.

(56) References Cited

U.S. PATENT DOCUMENTS

| | | | |
|---|---|---|---|
| 4,678,210 A | 7/1987 | Balsells | |
| 4,763,683 A | 8/1988 | Carmack | |
| 4,804,290 A | 2/1989 | Balsells | |
| 4,805,943 A | 2/1989 | Balsells | |
| 4,826,144 A | 5/1989 | Balsells | |
| 4,830,344 A | 5/1989 | Balsells | |
| 4,876,781 A | 10/1989 | Balsells | |
| 4,890,937 A | 1/1990 | Ballsells | |
| 4,893,795 A | 1/1990 | Balsells | |
| 4,907,788 A | 3/1990 | Balsells | |
| 4,915,366 A | 4/1990 | Balsells | |
| 4,934,666 A | 6/1990 | Balsells | |
| 4,961,253 A | 10/1990 | Balsells | |
| 4,964,204 A | 10/1990 | Balsells | |
| 4,974,821 A | 12/1990 | Balsells | |
| 5,072,070 A | 12/1991 | Balsells | |
| 5,108,078 A | 4/1992 | Balsells | |
| 5,117,066 A | 5/1992 | Balsells | |
| 5,134,244 A | 7/1992 | Balsells | |
| 5,139,234 A | 8/1992 | Cochrane | |
| 5,139,276 A | 8/1992 | Balsells | |
| 5,160,122 A | 11/1992 | Balsells | |
| 5,161,806 A | 11/1992 | Balsells | |
| 5,411,348 A | 5/1995 | Balsells | |
| 5,413,595 A * | 5/1995 | Stutz, Jr. .............. | A61N 1/3752 607/37 |
| 5,545,842 A | 8/1996 | Balsells | |
| 5,570,719 A | 11/1996 | Richards et al. | |
| 5,752,847 A * | 5/1998 | McCormick ......... | H01R 13/635 439/310 |
| 6,749,358 B2 * | 6/2004 | Balsells ............... | H01R 13/187 403/315 |
| 6,755,694 B2 * | 6/2004 | Ries ..................... | A61N 1/3752 439/218 |
| 6,878,013 B1 * | 4/2005 | Behan .................. | A61N 1/3752 439/335 |
| 8,167,285 B2 | 5/2012 | Balsells | |
| 8,297,662 B2 | 10/2012 | Ballsells | |
| 8,366,475 B2 * | 2/2013 | Smith .................. | A61N 1/3752 439/372 |
| 8,491,346 B2 * | 7/2013 | Sjostedt .............. | H01R 13/187 439/840 |
| 8,561,274 B2 | 10/2013 | Balsells | |
| 9,090,318 B2 * | 7/2015 | Koelling .............. | A43C 15/161 |
| 9,293,849 B2 * | 3/2016 | Balsells ................. | H01R 13/03 |
| 2009/0185853 A1 * | 7/2009 | Koelling .............. | A43C 15/161 403/229 |
| 2010/0037812 A1 * | 2/2010 | Sahr ........................ | B63B 29/04 114/363 |
| 2010/0289198 A1 * | 11/2010 | Balsells ................. | B21F 35/00 267/151 |

OTHER PUBLICATIONS

Bal Seal Engineering Company, Inc., "Latching and Holding with Bal Seal Canted-Coil Circular Welded Springs," Catalog Product News #164D, Nov. 23, 1991. (6 pages).

* cited by examiner

US 10,288,203 B2

LATCHING CONNECTOR WITH RADIAL GROOVES

This application claims the benefit of priority of U.S. Provisional Application Ser. No. 61/970,822 filed on Mar. 26, 2014.

FIELD OF THE INVENTION

The field of the invention is latching connectors.

BACKGROUND

The background description includes information that may be useful in understanding the present invention. It is not an admission that any of the information provided herein is prior art or relevant to the presently claimed invention, or that any publication specifically or implicitly referenced is prior art.

Latching connecters that have a pin, housing, and coil spring are used in many different applications and industries. See for example, U.S. Pat. Nos. 4,678,210, 4,763,683, 5,411,348, 5,545,842, 5,570,719, 8,167,285, 8,297,662, 8,561,274. Such latching connectors can be designed to have a desired connect force relative to disconnect force (e.g., greater than, equal to, less than) as required by a particular application. Various housing groove geometries, pin groove geometries, and coil spring configurations, and combinations thereof, are known for achieving various relative connect and disconnect forces. Unfortunately, many state of the art designs and configurations for latching connectors fail to provide consistent and reliable connect and disconnect forces. There still exists a need to create new latching connector configurations that provide consistent and reliable connections and that are less sensitive to manufacturing tolerances/variances and the orientation of the connector.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems, and methods in which a latching connector has a pin that is inserted into an opening (e.g., bore) of a housing. The pin and the housing each have a circumferential groove that is sized and dimensioned to receive a portion of a coil spring. Together, the pin groove, housing groove, and coil spring provide a latching force that couples and holds the pin with the housing. The geometries and material properties of the pin, housing, and canted coil spring also provide a consistent and reliable connect force and disconnect force.

In one aspect of some embodiments, the major axis of the canted coil spring is about equal to, or slightly less than, the radius of curvature of the housing groove and/or pin groove. This ensures that the canted coil spring will have multiple contact points with the housing groove and pin groove to improve electrical conductivity between the pin and housing via the canted coil spring.

In another aspect of some embodiments, the outer diameter of the canted coil spring is equal to, or slightly larger than, the diameter of the housing groove. This ensures that the canted coil spring will be held in place and its axis will always be aligned with the longitudinal axis of the opening of the housing, thus providing better reliability and consistency of connect and disconnect forces.

In yet another aspect of some embodiments, the pin insertion end also has a curved surface with a constant radius of curvature. The radius of curvature is preferably less than or equal to the radius of curvature of the curved surfaces of the pin groove and/or housing groove to achieve a connect force that is about equal to the disconnect force. In some embodiments, the radius of the curved surface of the pin insertion end is about 60% of the radius of the pin groove. However, it is also contemplated that in alternative embodiments the pin insertion end could have a tapered surface and/or a curved surface with a non-constant radius of curvature (rather than, or in addition to, a curved surface with a constant radius of curvature).

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 4b is a cross sectional view of the canted coil spring of FIG. 4a.

DETAILED DESCRIPTION OF THE INVENTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
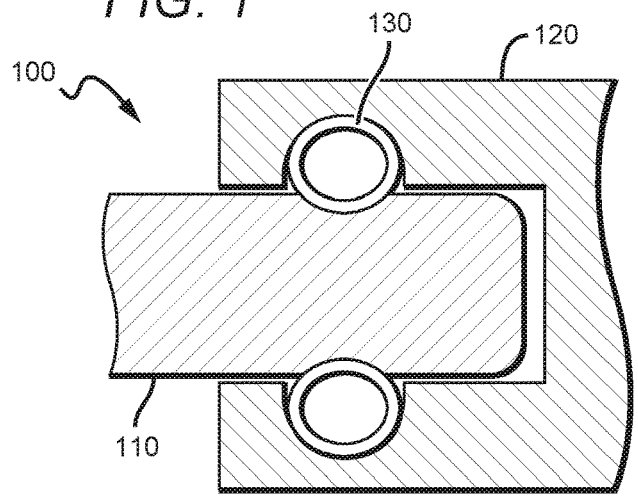
FIG. 1 is a side cross sectional view of a latching connector in a connected state.

FIG. 1 shows a latching connector 100, which comprises a pin 110, a housing 120, and a coil spring 130.

Figure 2:
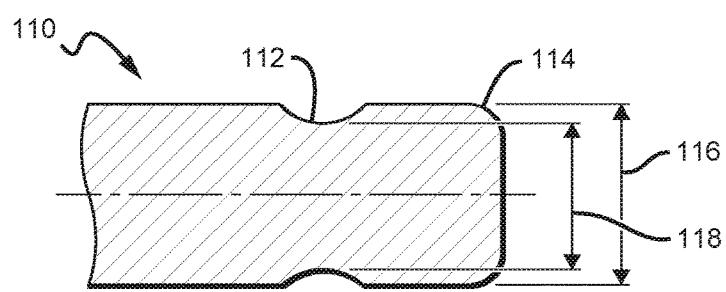
FIG. 2 is a side cross sectional view of the pin of FIG. 1.

FIG. 2 shows pin 110 alone. Pin 110 is an elongated member and has a pin groove 112 circumferentially (i.e., radially) disposed around its external surface. Pin groove 112 has a curved surface with a constant radius of curvature and a diameter 118. Pin 110 also has a pin insertion end 114, which has a curved surface (e.g., a filleted/rounded corner edge). In addition, pin 110 has an outer diameter 116. Pin 110 has a longitudinal axis shown by a dashed lined.

Figure 3:
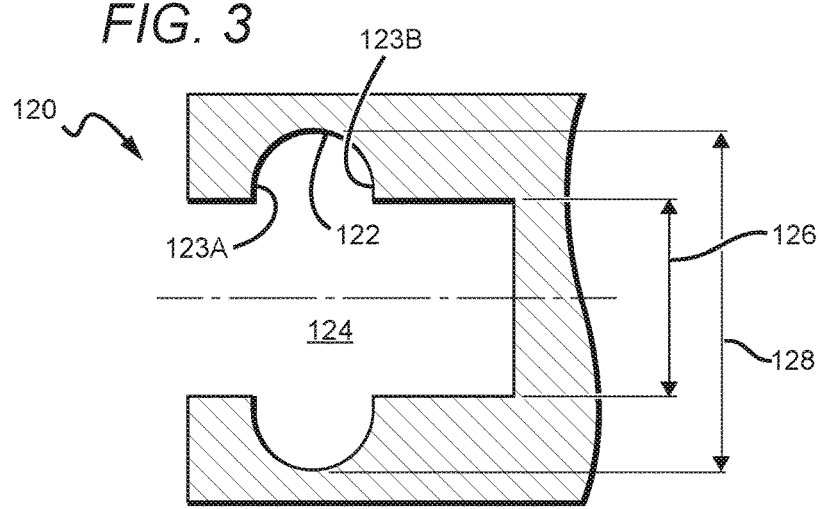
FIG. 3 is a side cross sectional view of the housing of FIG. 1.

FIG. 3 shows housing 120 alone. Housing 120 has an opening 124 (e.g., bore hole) with a diameter 126 that is sized and dimensioned to slidably receive diameter 116 of pin 110. Opening 124 also has a longitudinal axis shown by a dashed line. Within opening 124 is a housing groove 122. Like pin groove 112, housing groove 122 has a curved surface with a constant radius of curvature. The radius of the curved surface of housing groove 122 is "substantially similar" to the radius of pin groove 112, meaning the two curved surfaces are manufactured with an identical radius within a given tolerance (e.g., within 10%, 5%, 1%, etc.). Housing groove 122 has a diameter 128. Housing groove 122 also has two perpendicular sidewalls 123a and 123b extending from the ends of the curved surface, and which are parallel to one another and perpendicular to the longitudinal axis of opening 124. Sidewalls 123a and 123b help contain canted coil spring 130 when spring 130 resides within housing groove 122 and when pin 110 is inserted and/or removed. In alternative embodiments, sidewall 123a and/or 123b can be removed.

Figure 4A:
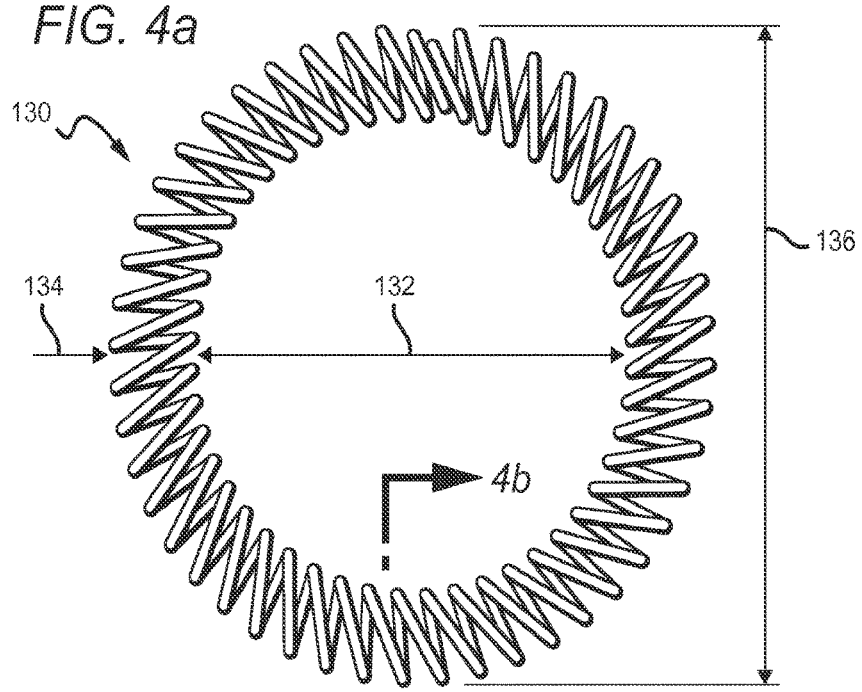
FIG. 4a is a side view of a canted coil spring.

FIG. 4a shows canted coil spring 130 alone. Spring 130 has an inner diameter 132, a minor axis 134, and an outer diameter 136.

Figure 4B:
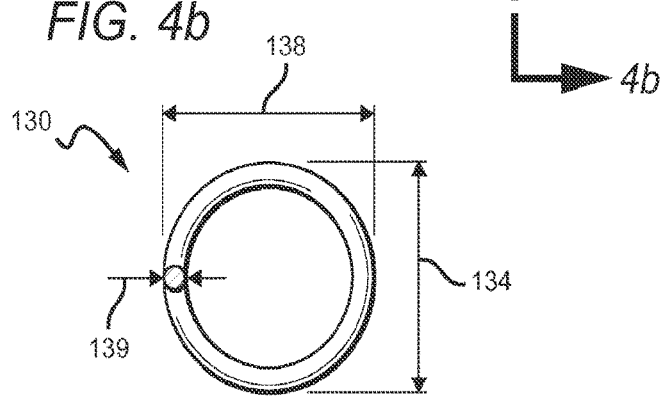

FIG. 4b shows a cross sectional view of a portion of canted coil spring 130. The cross sectional view of canted coil spring 130 has a major axis 138, a minor axis 134, and a wire diameter 139. Minor axis 134 is compressible due to the cant in the coils of spring 130, whereas major axis 138 tends to resist compression forces. This property allows inner diameter 132 of canted coil spring 130 to radially expand more easily than a non-canted coil spring (such as when pin 110 is inserted into and/or removed from opening 124 of housing 120). The properties of canted coil springs are further discussed in U.S. Pat. Nos. 4,655,462 and 4,893,795, which are incorporated herein by reference.

Major axis 138 is about equal to, or slightly less than, the radius of pin groove 112 and housing groove 122. In addition, outer diameter 136 of spring 130 is equal to, or slightly greater than, diameter 128 of housing groove 122 (i.e., "interference fit") such that spring 130 is nested (or seated) within housing groove 122. Furthermore, inner diameter 132 of spring 130 is about equal to pin groove diameter 118. Together, these relative geometries ensure that canted coil spring 130 will contact pin groove 112 and housing groove 122 at multiple contact points to thereby improve electrical conductivity between pin 110 and housing 120. (Note: FIGS. 1 and 5c showing connector 100 in a latched configuration or "connected state" do not illustrate the multiple contact points between spring 130 and grooves 112, 122, because those Figures are provided to clearly illustration of the geometries of pin groove 112, housing groove 122, and spring 130. However, a close-up view of these figures would reveal canted coil spring 130 simultaneously contacting both pin groove 112 and housing groove 122 at multiple locations.)

The interference fit between outer diameter 136 and housing groove diameter 128 also ensures that the center of spring 130 is aligned with the longitudinal axis of opening 124 of housing 120. This alignment provides greater reliability and consistency in connect and disconnect forces.

Figure 5A:
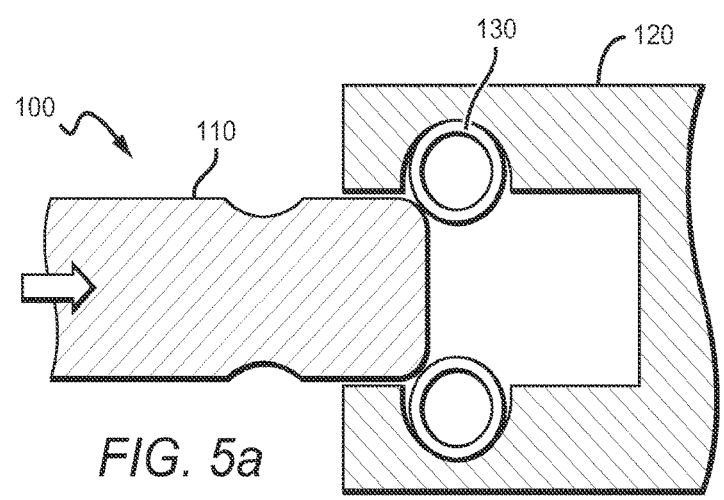
FIG. 5a is a side cross sectional view of a latching connector in a partially inserted state.
Figure 5B:
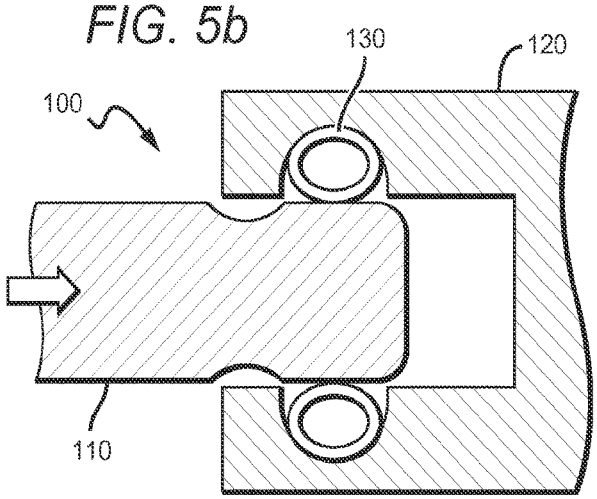
FIG. 5b is a side cross sectional view of a latching connector in a partially inserted state.
Figure 5C:
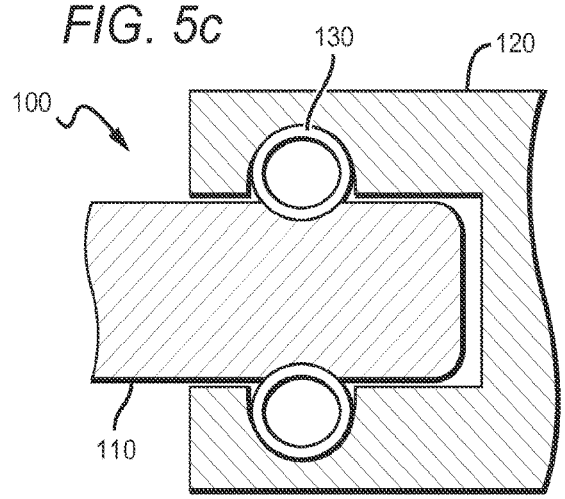
FIG. 5c is a side cross sectional view of a latching connector in a connected state.

FIG. 5a shows pin 110 being inserted into opening 124 of housing 120. Pin insertion end 114 contacts spring 130 and forces spring 130 to compress along its minor axis 134, thereby producing a connect force. FIG. 5b also shows pin 110 being inserted into opening 124 of housing 120 and farther along—spring 130 is now fully compressed.

FIG. 5c shows connector 100 in a latched/holding configuration (i.e., a "connected state"). Spring 130 is nested tightly in housing groove 122 and also resides in pin groove 112.

Figure 5D:
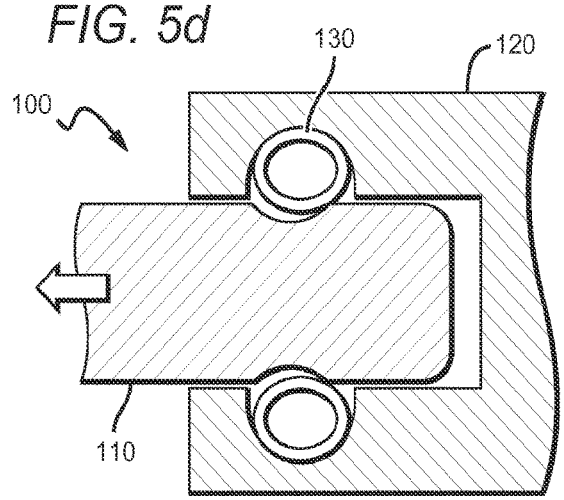
FIG. 5d is a side cross sectional view of a latching connector in a partially disconnected state.

FIG. 5d shows pin 110 being disconnected from opening 124 of housing 120. The curved surface of pin groove 112 (towards the pin insertion end 114) is contacting spring 130 and forcing spring 130 to compress, resulting in a disconnect force.

The radius of pin groove 112 and housing groove 122 can be adjusted relative to pin insertion end 114 so that connector 100 has a connect force that is substantially equal to the disconnect force (e.g., less than 10%, or 5%, or even 1% variation. In some embodiments, this is accomplished by making the radius of pin insertion end 114 to be about 60% of the radius of pin groove 112. By way of example, in one embodiment connector 100 can have the following dimensions:

Radius of grooves 112 and 122: 0.050 inches
Radius of pin insertion end 114: 0.030 inches
Pin outer diameter 116: 0.265 inches
Pin groove diameter 118: 0.245 inches
Bore diameter 126: 0.275 inches
Spring inner diameter 132: 0.239 inches
Spring minor axis 134: 0.083 inches
Spring major axis 138: 0.090 inches
Spring wire diameter 139: 0.011 inches The design principles of connector 100 provide a way of reducing inconsistent connect and disconnect forces for repeated uses of the same connector. For example, since the canted coil spring is nested (e.g., interference fitted) in a radius housing groove, the center of the spring is always aligned with the longitudinal axis of the housing bore, regardless of its orientation with respect to a field of gravity. This eliminates variance in connect and disconnect forces due to shifting of the canted coil spring within the housing groove.

The design principles of connector 100 also provide a way of reducing inconsistent connect and disconnect forces between different manufactured connectors. For example, manufacturing tolerances can result in pins, housings, and springs with slightly different geometries and properties. In particular, while it may be the intent of the spring manufacturer to make a canted coil spring with little-to-no concavity (see a discussion of spring concavity in U.S. Pat. No. 8,297,662 which is incorporated herein by reference), manufactured springs may nonetheless have different degrees of concavity from one part to another. However, the radius pin groove and radius housing groove inconsistencies in connect and disconnect forces due to the presence of unwanted spring concavity (or unwanted variances in spring concavity).

The connectors and methods of designing connectors described herein advantageously provide a way of improving the reliability and consistency of connect and disconnect forces. The disclosed connectors and methods also provide enhanced electrical contact between the canted coil spring and pin/housing grooves.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A connector comprising:
    a pin having an insertion end and a pin groove disposed radially around the pin, wherein the pin groove has a first curved surface comprising a first constant radius of curvature;
    a housing having an opening sized and dimensioned to slidably receive the pin, and a housing groove disposed radially within the opening, wherein the housing groove has a second curved surface comprising a second constant radius of curvature that is substantially equal to the first radius of curvature of the first curved surface of the pin groove,
        wherein the housing groove comprises a first sidewall and a second sidewall extending from opposite ends of the second curved surface of the housing groove, and
        wherein the first sidewall and the second sidewall are parallel to each other and perpendicular to a longitudinal axis of the opening; and
    a canted coil spring having an outer diameter, a major axis, and a minor axis, wherein the outer diameter is equal to or greater than a diameter of the housing groove and wherein the major axis is sized and dimensioned to fit in the housing groove.

2. The connector of claim 1, wherein geometry of the pin groove, pin insertion end, housing groove, and canted coil spring are configured to provide a connect force that is substantially equal to a disconnect force.

3. The connector of claim 1, wherein electricity can conduct between the pin and the housing through the canted coil spring when the pin is inserted in the opening.

4. The connector of claim 1, wherein geometry of the pin groove, housing groove, and canted coil spring are configured such that the canted coil spring simultaneously contacts both (i) the housing groove in multiple locations and (ii) the pin groove in multiple locations.

5. The connector of claim 4, wherein the pin groove, housing groove, and canted coil spring are made of an electrically conductive material.

6. The connector of claim 1, wherein the pin insertion end has a curved surface.

7. The connector of claim 6, wherein the curved surface of the pin insertion end has a radius of curvature that is less than or equal to the radius of curvature of the curved surface of the pin groove.

8. The connector of claim 6, wherein the curved surface of the pin insertion end has a radius of curvature that is 60% of the radius of curvature of the curved surface of the pin groove.

* * * * *